(12) United States Patent
Ino et al.

(10) Patent No.: US 6,539,907 B2
(45) Date of Patent: Apr. 1, 2003

(54) SUCTION DEVICE USED FOR INTERNAL COMBUSTION ENGINE

(75) Inventors: Masao Ino, Toyota (JP); Tetsuji Yamanaka, Obu (JP); Takashi Chaya, Kariya (JP); Toshio Hayashi, Anjo (JP)

(73) Assignee: Denso Corporation (JP)

( * ) Notice: Subject to any disclaimer, the term of this patent is extended or adjusted under 35 U.S.C. 154(b) by 0 days.

(21) Appl. No.: 09/996,778

(22) Filed: Nov. 30, 2001

(65) Prior Publication Data

US 2002/0066431 A1 Jun. 6, 2002

(30) Foreign Application Priority Data

Dec. 1, 2000 (JP) .................................. 2000-367118
Dec. 7, 2000 (JP) .................................. 2000-372443

(51) Int. Cl.$^7$ ............................................. F02M 35/10
(52) U.S. Cl. ............................ 123/184.55; 123/184.42
(58) Field of Search ....................... 123/184.55, 184.61, 123/184.34, 184.42, 184.47

(56) References Cited

U.S. PATENT DOCUMENTS 4,771,740 A * 9/1988 Koike ................... 123/184.55
5,630,387 A   5/1997 Kamiyama
6,283,078 B1 * 9/2001 Munetoki et al. ...... 123/184.61

FOREIGN PATENT DOCUMENTS

| EP | 0939211 A2 | 9/1999 |
| JP | 63-159 | 1/1988 |
| JP | 63-45058 | 3/1988 |
| JP | 8-193546 | 7/1996 |
| JP | 8-261081 | 10/1996 |
| JP | 2699915 | 9/1997 |
| JP | 2887873 | 2/1999 |
| JP | 11-247726 | 9/1999 |

\* cited by examiner

*Primary Examiner*—Noah P. Kamen
(74) *Attorney, Agent, or Firm*—Nixon & Vanderhye PC (57) ABSTRACT

A suction device used for an internal combustion engine includes a throttle passage, which is arranged on the upstream side, and also includes an air connector, a surge tank and suction manifolds which are arranged on the downstream side of the throttle passage. An opening section of the air connector arranged in the longitudinal direction on a side wall face of the surge tank is provided on a wall face corresponding to a position which becomes a substantial center of the suction manifold which is open to the surge tank. Due to the foregoing, intake air can be evenly distributed to the suction manifold, and lengths of the passages can be made equal to each other. Accordingly, the generation of a rumbling noise can be suppressed. Further, the suction manifold substantially encircles the outer circumferential wall faces of the surge tank and others. Therefore, it is possible to ensure a preferable passage length for obtaining the air charging efficiency corresponding to a running state of the internal combustion engine, and the engine output can be enhanced.

14 Claims, 4 Drawing Sheets

SUCTION DEVICE USED FOR INTERNAL COMBUSTION ENGINE

BACKGROUND OF THE INVENTION

1. Field of the Invention

The present invention relates to a suction device used for an internal combustion engine for distributing intake air to each cylinder of the internal combustion engine. More particularly, the present invention relates to a suction device used for an internal combustion engine capable of enlarging an amount of compaction for absorbing an impact.

2. Description of the Related Art

Conventionally, the prior art related to a suction device used for an internal combustion engine is disclosed in Japanese Unexamined Patent Publication No. 8-193546 and Japanese Patent No. 2887873. Japanese Unexamined Patent Publication No. 8-193546 discloses a technique by which intake air is evenly distributed to each cylinder of an internal combustion engine and the generation of suction noise, that is, the generation of a rumbling noise, which is an unpleasant noise transmitted into a passenger compartment when an automobile is accelerated, is reduced. Further, Japanese Patent No. 2887873 discloses a technique by which a necessary intake air passage length is ensured when a suction manifold is formed into a U-shape.

In this connection, the technique disclosed in the above Japanese Unexamined Patent Publication 8-193546 has the following disadvantages. Since the profile and state of connection of a throttle passage (first chamber) connected with a throttle body are complicated and also the profile and state of connection of a surge tank (second chamber) are complicated, the number of components is increased in the process of resin molding. Therefore, it is difficult to reduce the manufacturing cost. Further, since an air current is not smooth, the air resistance is so high that a loss of the engine output occurs. Furthermore, as it is necessary to provide a space for arranging a suction device in a cylinder head portion of an internal combustion engine (multiple cylinder engine), it is impossible to decrease the height of an engine compartment. Furthermore, it is difficult to provide a suction manifold passage length variable control system by which the air charging efficiency can be enhanced, in the engine speed range from low to high, when a passage length of a suction manifold is varied according to a running state of the internal combustion engine.

Japanese Patent No. 2887873 has the following disadvantages. Each lower branch tube of the suction manifold is formed into a U-shape, from the surge tank. Therefore, length of the passage of the suction manifold is extended. However, since the space in which components are arranged is limited, it is impossible to gently curve the U-shaped portion. Accordingly, the air resistance becomes high, which causes a loss of the engine output.

SUMMARY OF THE INVENTION

The present invention has been accomplished to solve the above problems. It is a task of the present invention to provide a suction device used for an internal combustion engine characterized in that: intake air can be evenly distributed to each cylinder of the internal combustion engine while the resistance of a current of intake air is being reduced, the suction device can be easily mounted on a vehicle; and the air charging efficiency can be enhanced according to a running state of the internal combustion engine.

Also, there is conventionally provided an independent fuel injection system in which an injector (fuel injection valve) and a fuel tube are arranged close to a connecting section of a suction manifold of a suction device with an internal combustion engine and fuel is independently injected from a respective injector (fuel injection valve) into each cylinder of the internal combustion engine, which is called MPI (Multi Point Injection).

In this case, the following situation is envisaged. A suction manifold of a suction device used for an internal combustion engine is arranged laterally with respect to the running direction of a vehicle and connected onto the front side of the internal combustion engine, and an impact force is given to the suction device from the front of the vehicle. In this case, the following problems may be encountered. When the suction manifold is deformed, an excessively large deformation is generated in the connecting section of a fuel tube. Therefore, an engagement section of the injector with the suction manifold is damaged or the leakage of fuel is caused by the buckling of the fuel tube.

In order to solve the above problems, Japanese Patent No. 2699915 discloses the following technique. A suction device (suction manifold block) of an internal combustion engine is connected with an outside of the internal combustion engine which arranged laterally with respect to the running direction of a vehicle. There is provided a fragile section, which extends in the axial direction of the suction manifold, in this suction device. In the case of a car collision, this fragile section of the suction manifold is broken, so that an impact force of the car collision is absorbed, and a horizontal cross section of the suction manifold is crushed, so that an occupied cubic volume is decreased and the amount of compaction of the suction device is increased.

That is, in the case of a car collision, the fragile section of the suction manifold is broken, so that the impact force can be absorbed, and the horizontal cross section is crushed and the occupied cubic volume is decreased. In this way, the amount of compaction can be increased.

In this connection, the above structure has the following disadvantages. Since the fragile section is arranged in a portion of the suction manifold which is easily broken by an impact force caused by a car collision, the mechanical strength of this fragile section of the suction manifold is not sufficiently high against external vibration and internal pressure fluctuation when this suction device is normally used.

The present invention has been accomplished to solve the above problems. It is a task of the present invention to provide a suction device used for an internal combustion engine characterized in that the mechanical strength for external vibration and internal pressure fluctuation, which are caused when the suction device is used in a normal state, is sufficiently high while a partial fragile section is not provided in the suction device; and a predetermined portion of the suction device is broken in the case of a car collision so that an impact force caused by the car collision can be absorbed.

A suction device used for an internal combustion engine of the first embodiment of the present invention is composed as follows. The suction device includes a throttle passage, a surge tank and suction manifolds which are arranged from an upstream side to a downstream side. On the downstream side of the throttle passage, there is provided an air connector which is arranged in the longitudinal direction on a side wall face of the surge tank. This air connector is arranged on a wall face corresponding to a position which is substantially a center of the suction manifold which opens to the surge tank. Due to the above structure, intake air can be evenly distributed from the air connector to each suction manifold via the surge tank. In the suction device of the internal combustion engine, when the position of the opening section of the air connector with respect to the surge tank is determined as described above, the length of the passage of the suction manifold including the surge tank can be made equal. Therefore, a rumbling noise (suction noise) can be suppressed.

In the suction device used for an internal combustion engine of the second embodiment of the present invention, the air connector is embedded on a wall face corresponding to a position which is substantially the center of an opening at which the suction manifold is open to the surge tank. Therefore, a total height of the air connector and the surge tank can be reduced.

In the suction device used for an internal combustion engine of the third embodiment of the present invention, the suction manifold is formed from the surge tank to the suction port in such a manner that the suction manifold substantially encircles the outer circumferential wall faces of the air connector and the surge tank. Therefore, in the suction manifold, it is possible to ensure a passage of an appropriate length for obtaining the air charging efficiency corresponding to a running state of the internal combustion engine. Due to the above structure, it is possible to increase an output of the internal combustion engine.

In the suction manifold of the suction device of the internal combustion engine of the fourth embodiment of the present invention, at least one portion on the wall face of the suction manifold is commonly used in the suction manifold and the surge tank. Therefore, volumes of the surge tank and the suction manifold can be increased. Due to the above structure, air resistance can be reduced without increasing the size of the suction device. Therefore, the air charging efficiency for each cylinder of the internal combustion engine can be enhanced.

In the fifth embodiment of the present invention, the suction manifold is open inward on one of the side walls of the surge tank and extended in such a manner that the suction manifold encircles at least an outer circumferential wall face from the side wall face to the other side wall face on the opposite side. Therefore, the radius of curvature of the suction manifold can be made sufficiently large. Accordingly, air resistance can be reduced to as small as possible. Due to the foregoing, the suction device used for an internal combustion engine can be easily mounted on a vehicle, and an engine output of the internal combustion engine can be increased.

According to the suction device used for an internal combustion engine of the sixth embodiment of the present invention, wall thickness in the circumferential direction of the wall section forming the suction passage is substantially uniform, that is, the suction device does not have a partial fragile portion. Therefore, a sufficiently high mechanical strength can be exhibited with respect to external vibration and fluctuation of internal pressure when the suction device is normally used. Since wall thickness in the circumferential direction of the wall section which is substantially perpendicular to the running direction of the vehicle is smaller than wall thickness in the circumferential direction of the wall section which is substantially horizontal to the running direction of the vehicle, an impact force can be absorbed by a breakdown of the wall section which is substantially perpendicular to the running direction of the vehicle in the case of a car collision. Therefore, deformation of the wall section which is substantially horizontal to the running direction of the vehicle can be reduced to as small as possible. For example, damage given to the injector and the fuel tube, which are attached to the wall section of the connecting section with the internal combustion engine, can be reduced.

In the wall section in the suction device used for an internal combustion engine of the seventh embodiment of the present invention, when the suction device is given an impact force from the front in the case of a car collision, a breakdown is caused in a transition region which is formed from a portion substantially perpendicular to the running direction of the vehicle, the cross section of which is formed into a substantial semicircle, to a portion substantially horizontal to the running direction of the vehicle. Due to the foregoing, deformation of the wall section of the connecting section of the suction device with the internal combustion engine can be reduced to as small as possible.

The present invention will be more fully understood from the description of preferred embodiments of the invention set forth below, together with the accompanying drawings.

DESCRIPTION OF THE PREFERRED EMBODIMENTS

Embodiments of the present invention will be explained below referring to examples.

Figure 1:
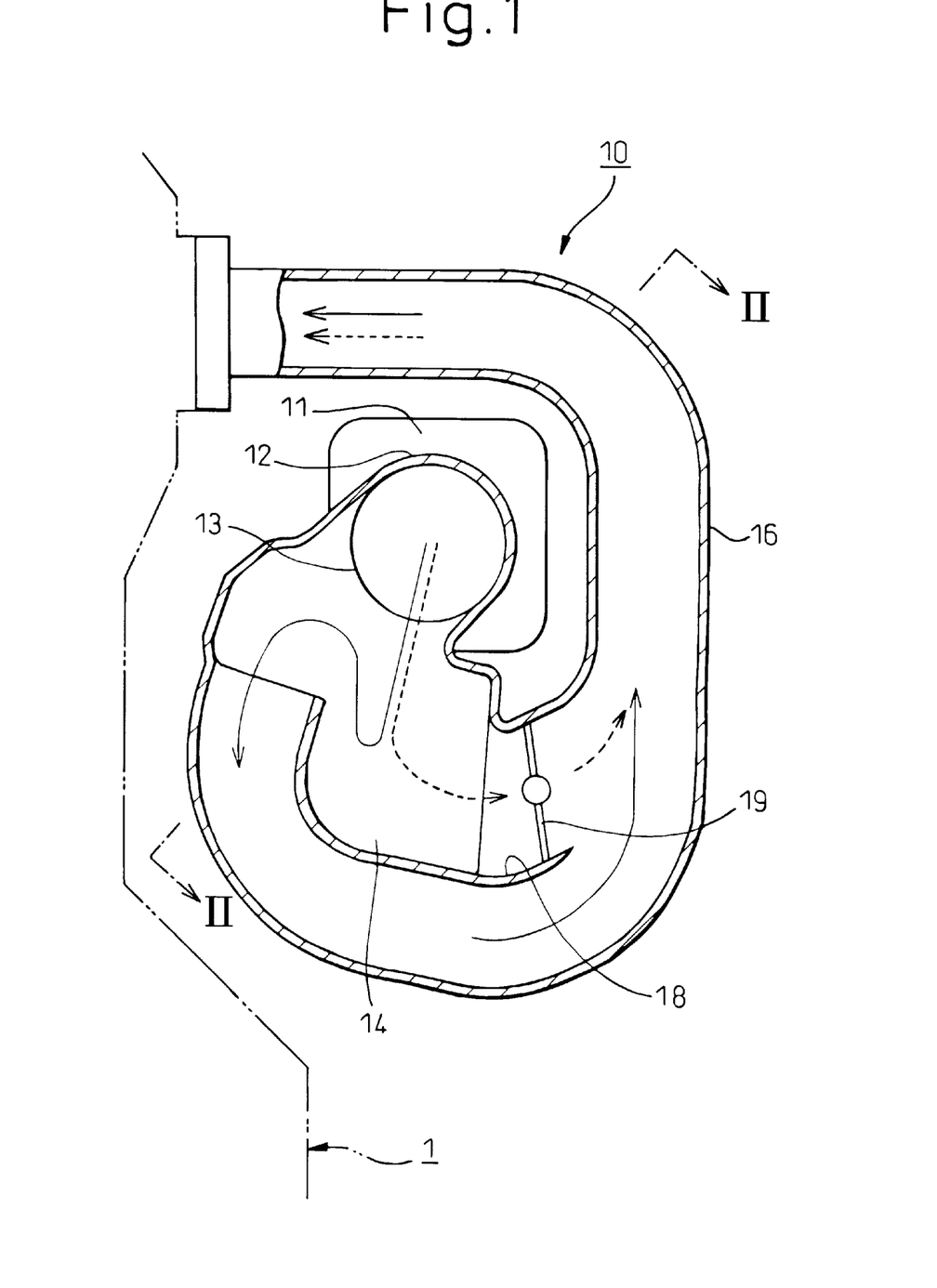
FIG. 1 is a cross-sectional view showing an arrangement of a primary portion of a suction device used for an internal combustion engine of the first embodiment of the present invention.
Figure 2:
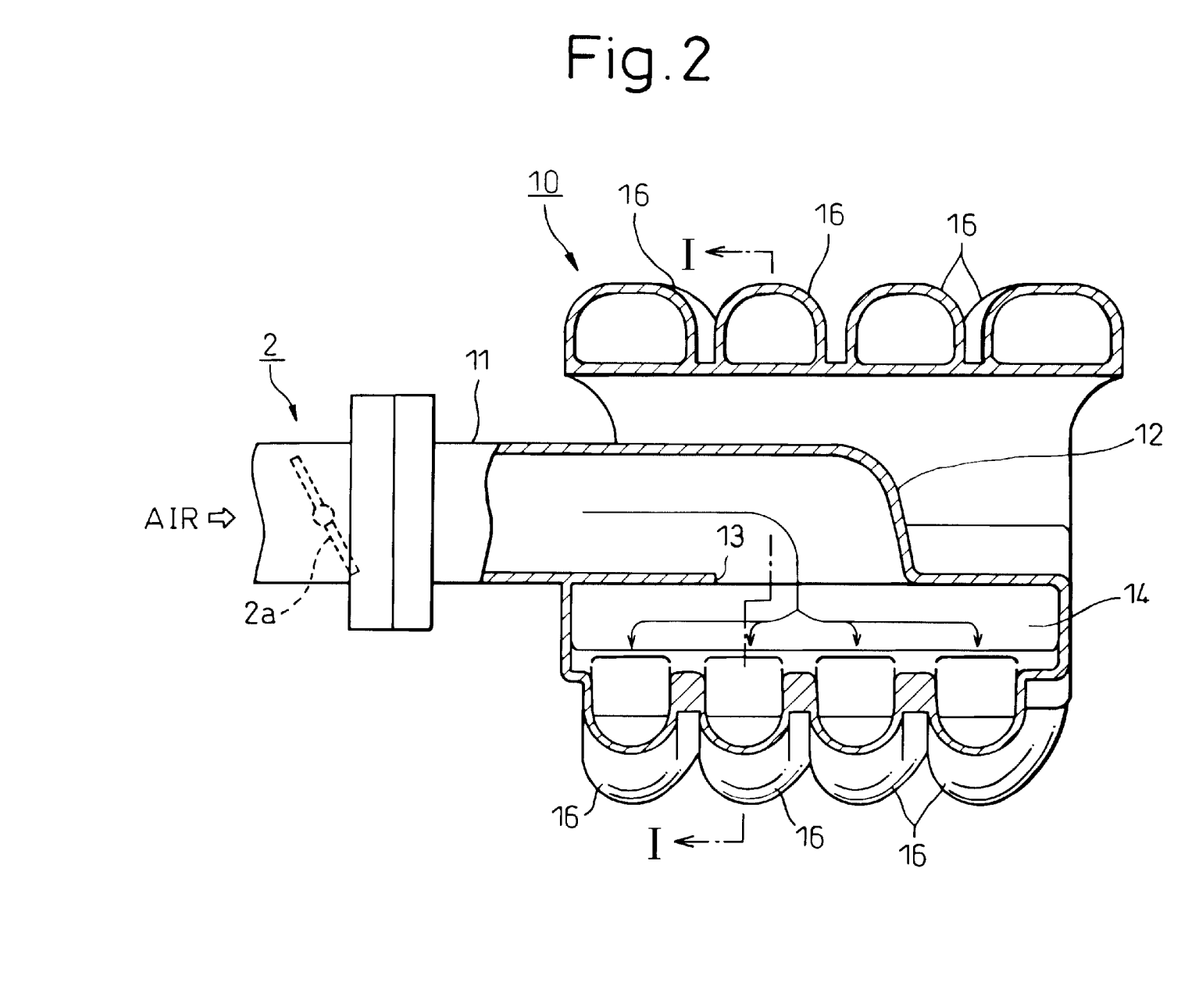
FIG. 2 is a cross-sectional view taken on line II—II in FIG. 1.

First, a suction device used for an internal combustion engine of the first embodiment of the present invention will be explained as follows. FIG. 1 is a cross-sectional view showing an arrangement of a primary portion of a suction device 10 used for an internal combustion engine of the first embodiment of the present invention. FIG. 2 is a cross-sectional view taken on line II—II in FIG. 1. In this connection, FIG. 1 corresponds to a cross section taken on line I—I in FIG. 2.

In FIGS. 1 and 2, the suction device 10 used for an internal combustion engine is connected with the throttle body 2 having the throttle valve 2a for adjusting a quantity of intake air which is sucked via an air cleaner (not shown in the drawing) arranged on the upstream side. In this case, the throttle valve 2a adjusts a quantity of intake air when the degree of opening is changed. The suction device 10 used for an internal combustion engine includes: a throttle passage 11 which is arranged on the throttle body 2 side; an air connector 12 which is integrally arranged on the downstream side of the throttle passage 11; a surge tank 14 which is connected with the air connector 12 by the opening section 13; and four suction manifolds 16, which are connected with this surge tank 14, for distributing intake air into cylinders of the internal combustion engine 1. In this embodiment, it is estimated that the present invention is applied to an internal combustion engine with four cylinders.

In this structure, the air connector 12 arranged on the downstream side of the throttle passage 11 is integrally formed in the longitudinal direction on the side wall face of the surge tank 14. As shown in FIG. 2, the opening section 13 of the air connector 12 is formed at a position which is a substantial center of the suction manifold 16 of each cylinder of the internal combustion engine 1 which is open to the surge tank 14. As shown in FIG. 1, in the suction device 10 used for an internal combustion engine, the bypass passage 18, which bypasses a lower winding portion on the outer circumferential side of each suction manifold 16, is open to an intermediate portion between the surge tank 14 and each suction manifold 16. In the middle of the bypass passage 18, the bypass opening and closing valve 19 is arranged.

In this connection, a connecting structure of the injector (fuel injection valve), which is arranged close to an end portion of each suction manifold 16 connected with a suction port (not shown) of each cylinder of the internal combustion engine 1, for injecting fuel into the internal combustion engine, is omitted here.

Next, referring to FIGS. 1 and 2, a current of air from the throttle passage 11 to the suction manifold 16 in the suction device 10 used for an internal combustion engine 10 will be explained by referring to FIGS. 1 and 2.

As shown by arrows in FIGS. 1 and 2, intake air introduced from the throttle body 2 side passes through the throttle passage 11 and the air connector 12, which is integrally formed on the downstream side of the throttle passage 11, and is introduced into the surge tank 14 and sent out from the surge tank 14 into the suction manifold 16 of each cylinder of the internal combustion engine 1.

As described before, the internal combustion engine 10 is composed in such a manner that the opening section 13 of the air connector 12 is formed at a position corresponding to a substantial center of the suction manifold 16 of each cylinder of the internal combustion engine 1 which is open to the surge tank 14. Due to the above structure, it is possible to evenly distribute intake air into the cylinders. Therefore, although the internal combustion engine 10 is of the side throttle type in which the throttle passage 11 connecting with the throttle body 2 is arranged in parallel with the longitudinal direction on the surge tank 14, in the same manner as that of the center throttle type in which the throttle passage is perpendicularly connected with the center of the surge tank, it is possible to make the passage length of the suction manifold 16 including the surge tank 14 equal by the position of the opening section 13 of the air connector 12 with respect to the surge tank 14. Therefore, it is possible to suppress the generation of rumbling noise which is transmitted into a passenger compartment in the case of accelerating a vehicle.

Further, the suction device of the internal combustion engine 10 is composed in such a manner that the air connector 12 is embedded on a wall face corresponding to a position which is a substantial center of each suction manifold 16 which is open to the surge tank 14. That is, the air connector 12 on the downstream side of the throttle passage 11 is embedded in the surge tank 14, and both wall faces are partially used in common. Therefore, the total height of the suction device can be reduced.

Next, referring to FIG. 1, an action and effect of the suction manifold passage length variable control system in the suction device 10 used for an internal combustion engine of this embodiment will be explained below.

First, when the internal combustion engine 1 is operated at a low speed, the bypass opening and closing valve 19 is closed. Therefore, when the internal combustion engine 1 is operated at low speed, as shown by solid-line arrows in FIG. 1, a quantity of air corresponding to the operation state of the internal combustion engine 1 is introduced onto the suction port side of each cylinder while air flows from the surge tank 14 and passes through a long passage composed of a lower winding portion on the outer circumferential side of the suction manifold 16. Due to the foregoing, the inertia supercharging effect of the internal combustion engine 1 is utilized when the engine speed is low, and the air charging efficiency can be enhanced and the engine output can be increased.

On the other hand, when the internal combustion engine 1 is operated at a high speed, the bypass opening and closing valve 19 is opened. Therefore, when the internal combustion engine 1 is operated at a high speed, as shown by broken-line arrows in FIG. 1, intake air does not flow in the lower winding portion on the outer circumferential side of the suction manifold 16 but flows in a short passage composed of the bypass passage 18, which is arranged inside the lower winding portion on the outer circumferential side of the suction manifold 16, and the suction manifold 16 on the downstream side. In this way, a quantity of intake air corresponding to a running state of the internal combustion engine 1 is introduced onto the suction port side of each cylinder. Due to the foregoing, the inertia supercharging effect of the internal combustion engine 1 can be utilized when the internal combustion engine 1 is operated at a high speed. Therefore, the air charging efficiency can be enhanced and the engine output can be increased.

Concerning the position at which a supply tube for supplying vaporized fuel, which is generated in an EGR (Exhaust Gas Recirculation) system, a PCV (Positive Crankcase Ventilation) system and in a fuel tank and adsorbed by a canister, is connected, a side wall of the throttle passage 11 and an end wall of the air connector 12 are utilized. Due to the foregoing, intake air can be more evenly distributed into the suction manifolds 16.

As described above, the suction device 10 used for an internal combustion engine of this embodiment includes: a throttle passage 11 connected with the throttle body 2 in which the throttle valve 2a for adjusting a quantity of air sucked via an air cleaner (not shown) is arranged; a surge tank 14 connected with the throttle passage 11; and four (a plurality of) suction manifolds 16 connected with the suction ports (not shown) of the cylinders of the internal combustion engine 1. On the downstream side of the throttle passage 11, there is provided an air connector 12 which is arranged on the side wall face of the surge tank 14 in the longitudinal direction. On a wall face corresponding to a position which becomes a substantial center of the opening of the suction manifold 16 which is open to the surge tank 14, there is provided an opening section 13 of the air connector 12.

That is, the suction device 10 used for an internal combustion engine includes: a throttle passage 11; a surge tank 14; and suction manifolds 16, wherein these components are arranged in this order from the upstream side. In this structure, on the downstream side of the throttle passage 11, the air connector 12 is formed on a side wall face of the surge tank 14 in the longitudinal direction. The opening section 13 of this air connector 12 is arranged on a wall face corresponding to a position which is a substantial center of the opening of the suction manifold 16 which is open to the surge tank 14. Due to the above structure, intake air can be evenly distributed from the air connector 12 into the suction manifolds 16 via the surge tank 14. In the suction device 10 used for an internal combustion engine, it is possible to make the passage length of the suction manifold 16 including the surge tank 14 equal by the position of the opening section 13 of the air connector 12 with respect to the surge tank 14. Therefore, it is possible to suppress the generation of a rumbling noise (suction noise).

The suction device of the internal combustion engine 10 is composed in such a manner that the air connector 12 is embedded on a wall face corresponding to a position which is a substantial center of each suction manifold 16 which is open to the surge tank 14. Therefore, the total height of the air connector 12 and the surge tank 14 can be reduced.

In the suction device 10 used for an internal combustion engine of this embodiment, the suction manifold 16 is composed in such a manner that the suction manifold 16 substantially encircles the outer circumferential walls of the air connector 12 and the surge tank 14 from the surge tank 14 to the suction port (not shown in the drawing). Due to the above structure, it is possible for the suction manifold 16 to ensure a preferable passage length for obtaining the air charging efficiency according to a running state of the internal combustion engine 1.

Concerning the suction manifold 16 of the suction device 10 used for an internal combustion engine 10, at least a portion on the wall of the suction manifold 16 is jointly used as a wall face of the surge tank 14. Accordingly, it is possible to increase the volumes of the surge tank 14 and of the suction manifold 16. Therefore, it is possible to reduce the air resistance without increasing the size of the suction manifold 16, and the air charging efficiency of each cylinder of the internal combustion engine 1 can be enhanced.

The suction manifold 16 of the suction device 10 used for an internal combustion engine of this embodiment is opened inward on one of the side wall faces of the surge tank 14 and extended in such a manner that the suction manifold 16 encircles at least the outer circumferential wall face from the side wall face to the other side wall face on the opposite side. Accordingly, the suction manifold 16 of the suction device 10 used for an internal combustion engine can be formed in such a manner that it is gently curved, so that air resistance can be reduced to as low as possible. Although it is possible for the suction manifold 16 to ensure an appropriate passage length for improving the air charging efficiency according to a running state of the internal combustion engine 1, the suction manifold 16 can be made compact. Therefore, the suction device 10 used for an internal combustion engine into which the suction manifold 16 is incorporated can be easily mounted on a vehicle, and further it is possible to enhance an output of the internal combustion engine 1.

Figure 3:
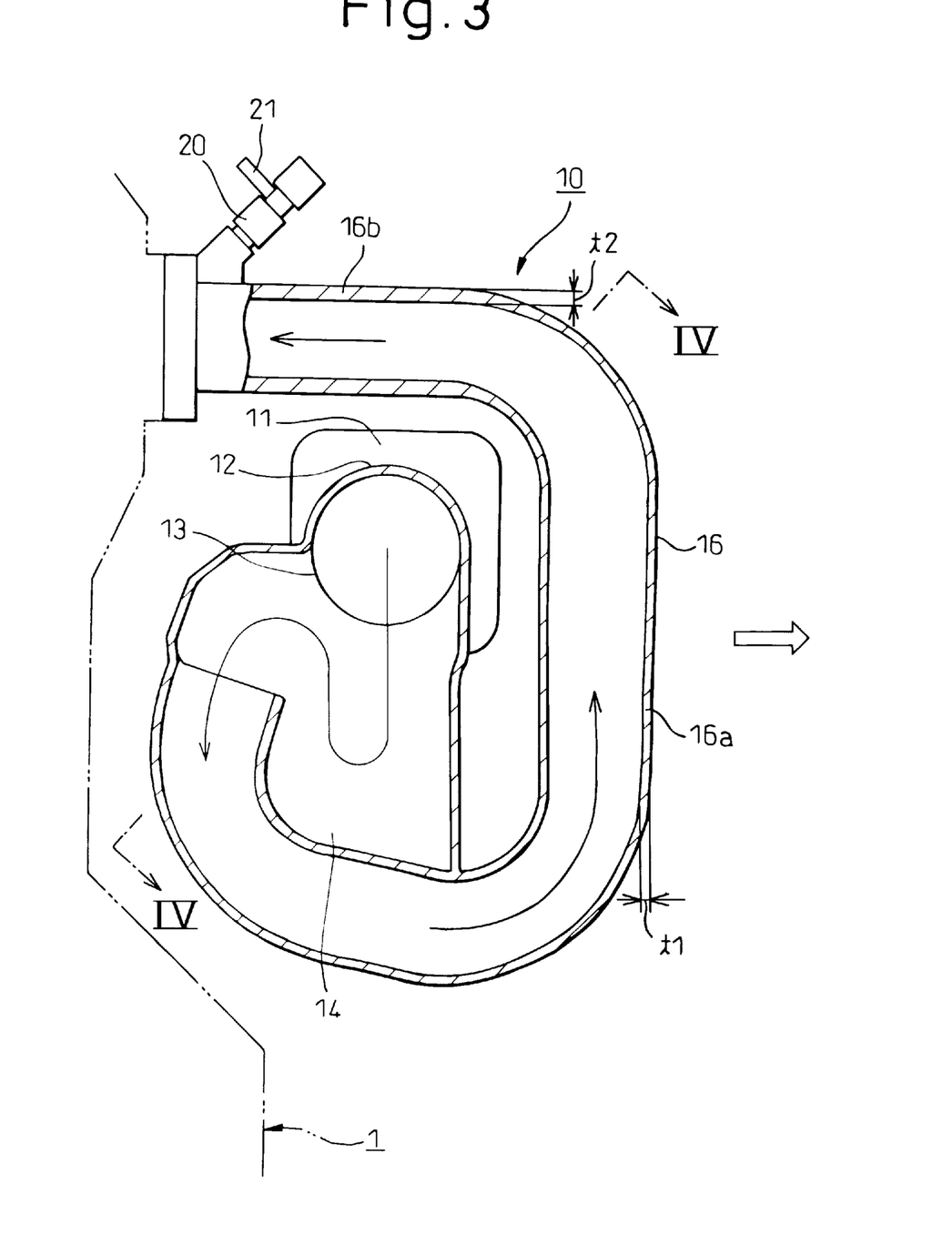
FIG. 3 is a cross-sectional view showing an arrangement of a primary portion of a suction device used for an internal combustion engine of the second embodiment of the present invention.
Figure 4:
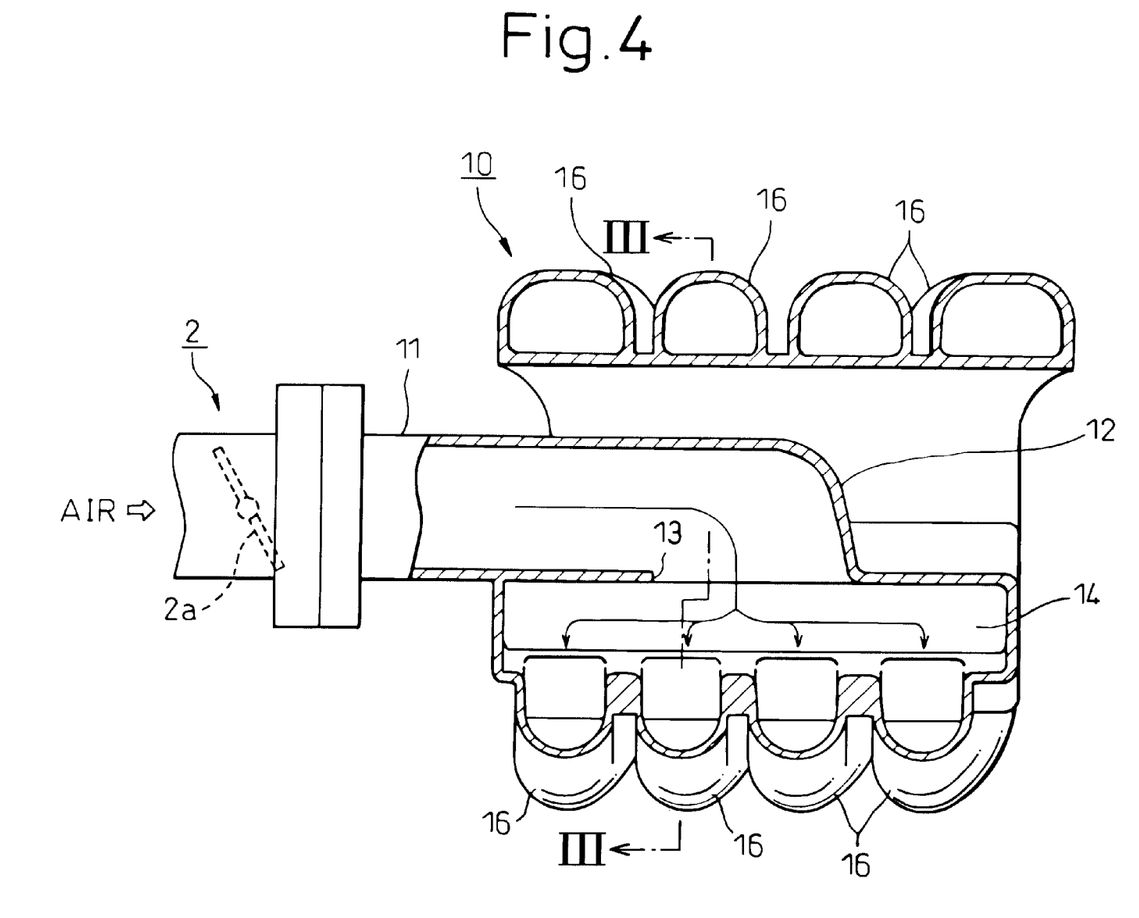
FIG. 4 is a cross-sectional view taken on line IV—IV in FIG. 3.

Next, a suction device used for an internal combustion engine of the second embodiment of the present invention will be explained as follows. FIG. 3 is a cross-sectional view showing an arrangement of a primary portion of a suction device used for an internal combustion engine of the second embodiment of the present invention. FIG. 4 is a cross-sectional view taken on line IV—IV in FIG. 3. FIG. 3 corresponds to a cross section taken on line III—III in FIG. 4.

In FIGS. 3 and 4, the suction device 10 used for an internal combustion engine is connected with the throttle body 2 having the throttle valve 2a for adjusting a quantity of intake air which is sucked via an air cleaner (not shown in the drawing) arranged on the upstream side. In this case, the throttle valve 2a adjusts a quantity of intake air when the degree of opening is changed. The suction device 10 used for an internal combustion engine includes: a throttle passage 11 which is arranged on the throttle body 2 side; an air connector 12 which is integrally arranged on the downstream side of the throttle passage 11; a surge tank 14 which is connected with the air connector 12 by the opening section 13; and four suction manifolds 16, which are connected with this surge tank 14, for distributing intake air into cylinders of the internal combustion engine 1. In this embodiment, it is estimated that the present invention is applied to an internal combustion engine with four cylinders.

In this structure, the air connector 12 arranged on the downstream side of the throttle passage 11 is integrally formed in the longitudinal direction on the side wall face of the surge tank 14. As shown in FIG. 4, the opening section 13 of the air connector 12 is formed at a position which is a substantial center of the suction manifold 16 of each cylinder of the internal combustion engine 1 which is open to the surge tank 14. Due to the above structure, it is possible to evenly distribute intake air to the suction manifolds 16. The passage length of the suction manifold 16 including the surge tank 14 can be made equal by the position of the opening section 13 of the air connector 12 with respect to the surge tank 14. Therefore, it is possible to suppress the generation of rumbling noise which is transmitted into a passenger compartment in the case of accelerating a vehicle.

At a position close to the end portion of each suction manifold 16 connected with the suction port (not shown) of each cylinder of the internal combustion engine, there is provided an injector (fuel injection valve) 20. The fuel pipe 21 is connected with each injector 20. According to a running state of the internal combustion engine 1, fuel is injected from each injector 20 into each cylinder of the internal combustion engine 1.

As shown by solid-line arrows in FIGS. 3 and 4, air, which has been introduced from the throttle body 2 side, flows into the throttle passage 11 of the suction device 10 used for an internal combustion engine and also flows in the air connector 12 which is integrally formed on the downstream side of the throttle passage 11. Then, air is introduced into the surge tank 14 and sent from the surge tank 14 to the suction port of each cylinder of the internal combustion engine 1 via the suction manifold 16 of each cylinder of the internal combustion engine 1.

Concerning the position at which a supply tube for supplying vaporized fuel, which is generated in an EGR (Exhaust Gas Recirculation) system, a PCV (Positive Crankcase Ventilation) system and in a fuel tank and adsorbed by a canister, is connected, a side wall of the throttle passage 11 and an end wall of the air connector 12 are utilized. Due to the foregoing, intake air can be more evenly distributed into the suction manifolds 16.

Next, referring to FIGS. 3 and 4, explanations will be made into an action and effect of the suction device 10 used for an internal combustion engine, which is assembled to the suction port portion of the internal combustion engine 1 by bolts (not shown in the drawing), in the case of a car collision.

As described above, the suction passage of the suction device 10 used for an internal combustion engine is composed of the throttle passage 11, air connector 12, surge tank 14 and suction manifold 16. A wall section 16a of the suction manifold 16, which is one of the components composing the suction passage of the suction device 10 and is substantially perpendicular to the running direction of the vehicle, is arranged on the front face of the internal combustion engine 1 in the running direction of the vehicle. In this case, the running direction of the vehicle is shown by the white arrow in FIG. 3. In the section connecting with the internal combustion engine 1, the wall thickness t1 (for example, 2.0 to 2.5 mm) of this wall section 16a in the circumferential direction is smaller than the wall thickness t2 (for example, 3.0 to 4.0 mm) of the wall section 16b of the suction manifold 16 which is substantially horizontal with respect to the running direction of the vehicle.

Due to the above structure, in the case of a car 25 collision, an impact force is given to the wall section 16a, which is substantially perpendicular to the running direction of the vehicle, of the suction manifold 16 of the suction device 10 used for an internal combustion engine arranged on the front face in the running direction of the vehicle. In this case, the wall section 16b of the suction manifold 16 is substantially horizontal to the running direction of the vehicle, and wall thickness of the wall section 16b of the suction manifold 16 is large, that is, wall thickness of the wall section 16b of the suction manifold 16 is t2. Therefore, the mechanical strength of the wall section 16b of the suction manifold 16 is sufficiently high when an impact force is given to the suction manifold 16. On the other hand, the wall section 16a of the suction manifold 16 is substantially perpendicular to the running direction of the vehicle, and wall thickness of the wall section 16a of the suction manifold 16 is small, that is, wall thickness of the wall section 16a of the suction manifold 16 is t1. Therefore, the wall section 16a of the suction manifold 16 is relatively fragile and easily crushed when an impact force is given to it. Due to the foregoing, a volume at the front face of the suction manifold 16 is reduced and an impact force, given to the suction device in the case of a car collision, can be absorbed. In this case, a transition region, which is a portion close to the cross section of the suction manifold 16 taken on line IV—IV in FIG. 3, in which the wall thickness changes from the small thickness t1 of the wall section 16a to the large thickness t2 of the wall section 16b, becomes a portion to be broken in the case of a car collision.

As shown in FIG. 4, a cross section of the transition region, in which the wall thickness changes from the small thickness t1 of the wall section 16a of the suction manifold 16 substantially perpendicular to the running direction of the vehicle to the large thickness t2 of the wall section 16b of the suction manifold 16 substantially horizontal to the running direction of the vehicle, is formed into a substantial semicircle. Therefore, it can be said that this profile is mechanically weak when an impact force is given from the front of a vehicle.

As described above, the suction device 10 used for an internal combustion engine of this embodiment is composed as follows. The suction device 10 is connected with a suction port (not shown in the drawing) arranged outside the internal combustion engine 1 which is arranged laterally with respect to the running direction of a vehicle. Wall thickness of the wall section in the circumferential section forming the suction passage of the suction device 10 used for an internal combustion engine is made substantially uniform, and the wall thickness t1 in the circumferential direction of the wall section 16a on the front side of the internal combustion engine 1, which is substantially perpendicular to the running direction of the vehicle, is made smaller than the wall thickness t2 in the circumferential direction of the wall section 16b at the connecting section with the internal combustion engine 1 which is substantially horizontal to the running direction of the vehicle.

That is, the suction device 10 used for an internal combustion engine is composed in such a manner that wall thickness of the wall section forming the suction passage is uniform in the circumferential direction, and the suction device 10 has no partially fragile portion. Therefore, the suction device 10 can exhibit a sufficiently high mechanical strength with respect to external vibration and fluctuation of inner pressure caused when the suction device 10 is normally used. Also, the suction device 10 used for an internal combustion engine is composed in such a manner that the wall thickness t1 in the circumferential direction of the wall section 16a, which is substantially perpendicular to the running direction of the vehicle, is made smaller than the wall thickness t2 in the circumferential direction of the wall section 16b at the connecting section with the internal combustion engine 1 which is substantially horizontal to the running direction of the vehicle. Therefore, in the case of a car collision, it is possible to absorb an impact force given to the car when the wall section 16a is broken. Therefore, deformation of the wall section 16b, which is substantially horizontal to the running direction of the vehicle, can be reduced to as small as possible. Therefore, damage given to the injector 20 and the fuel tube 21, which are attached to the wall section 16b of the connecting section with the internal combustion engine 1, can be reduced, and leakage of fuel can be prevented.

The wall section of the suction device 10 used for an internal combustion engine of the present embodiment is composed as follows. On the front side of the internal combustion engine 1, a cross section of the transition region, which is formed from a portion substantially perpendicular to the running direction of the vehicle to a portion substantially horizontal to the running direction of the vehicle, is formed into at least a substantial semicircle. That is, when the suction device 10 used for an internal combustion engine is given an impact force from the front of the vehicle in the case of a car collision, the suction device 10 has a breakdown in the transition region from a portion, the cross section of which is substantially semicircular, which is formed substantially perpendicular to the running direction of the vehicle, to a portion which is substantially horizontal to the running direction of the vehicle. Due to the foregoing, deformation of the connecting section with the internal combustion engine 1 on the wall section 16b side can be reduced to as small as possible.

In this connection, in the above embodiment, an impact force is absorbed by the substantially perpendicular portion when the wall thickness of the wall section of the suction manifold of the suction device used for an internal combustion engine is changed. However, it should be noted that the present invention is not limited to the above specific embodiment. When the wall thickness of the wall section of the suction manifold is taken in a board sense, the following method may be adopted. In the case of making a suction manifold of resin, a specific molding condition is devised, and one portion of the suction manifold is made of resin of high density and the other portion of the suction manifold is made of resin of low density. In this way, the same effect as that described above can be provided.

In the case where resin containing glass fiber is used for increasing the mechanical strength of the suction device used for an internal combustion engine, it is possible to enhance rigidity of the substantially horizontal portion to be higher than rigidity of the substantially perpendicular portion by devising a specific molding condition and increasing a quantity of additive in the substantially horizontal portion of the suction manifold to be larger than a quantity of additive in the substantially perpendicular portion.

While the invention has been described by reference to specific embodiments chosen for purposes of illustration, it should be apparent that numerous modifications could be made thereto by those skilled in the art without departing from the basic concept and scope of the invention.

What is claimed is:

1. A suction device used for an internal combustion engine comprising: a throttle passage connecting with a throttle body in which a throttle valve for adjusting a quantity of air sucked into a cylinder via an air cleaner is arranged; a surge tank connecting with the throttle passage; and a plurality of suction manifolds connecting the surge tank with a suction port of each cylinder of the internal combustion engine, wherein the throttle passage has an air connector which is formed on a side wall face of the surge tank in the longitudinal direction and arranged on the downstream side of the throttle passage, and an opening section of the air connector is arranged on a wall face corresponding to a position which becomes a substantial center of the suction manifold which is open to the surge tank.

2. A suction device used for an internal combustion engine according to claim 1, wherein the air connector is embedded on a wall face corresponding to a position which is a substantial center of an opening at which the suction manifold is open to the surge tank.

3. A suction device used for an internal combustion engine according to claim 1, wherein the suction manifold is formed from the surge tank to the suction port in such a manner that the suction manifold substantially encircles the outer circumferential wall faces of the air connector and the surge tank.

4. A suction device used for an internal combustion engine according to claim 1, wherein at least one portion on the wall face of the suction manifold is used commonly by the suction manifold and the surge tank.

5. A suction device used for an internal combustion engine according to claim 1, wherein the suction manifold is opened inward on one of the side walls of the surge tank and is extended in such a manner that the suction manifold encircles at least an outer circumferential wall face form the side wall face to the other side wall face on the opposite side.

6. A suction device used for an internal combustion engine connected with an outside of an internal combustion engine laterally arranged with respect to a running direction of a vehicle, wherein wall thickness in the circumferential direction of a wall section forming a suction passage of the suction device used for an internal combustion engine is made substantially uniform, wall thickness in the circumferential direction of the wall section substantially perpendicular to the running direction of the vehicle on the front face side of the internal combustion engine is smaller than wall thickness in the circumferential direction of the wall section substantially horizontal to the running direction of the vehicle in a connecting portion with the internal combustion engine.

7. A suction device used for an internal combustion engine according to claim 6, wherein a profile of a cross section of the wall section of the suction device used for an internal combustion engine in a transition region from a portion substantially perpendicular to a running direction of the vehicle on the front face side of the internal combustion engine to a portion substantially horizontal to the running direction of the vehicle is formed into at least a substantial semicircle.

8. A suction device for an internal combustion engine, connected with an outside of the internal combustion engine laterally arranged with respect to a running direction of the vehicle, and including a wall section forming a suction passage;

wherein a wall thickness of the wall section in the circumferential direction is substantially uniform, a first wall thickness in the circumferential direction of the wall section substantially perpendicular to the running direction of the vehicle on the front face side of the internal combustion engine is smaller than a second wall thickness in the circumferential direction of the wall section substantially horizontal to the running direction of the vehicle adjacent a connecting portion with the internal combustion engine, so as to deform easily when an impact force is given from the front of a vehicle, and wherein a wall thickness in the circumferential direction of the wall section at a transition region from the horizontal portion to the perpendicular portion gradually changes from the second wall thickness to the first wall thickness so that a stress at said transition portion for supporting a weight of the suction device is made small.

9. A suction device according to claim 8, wherein a profile of a cross section of the wall section of the suction device in said transition region, from a portion substantially perpendicular to a running direction of the vehicle on the front face side of the internal combustion engine to a portion substantially horizontal to the running direction of the vehicle, is formed into at least a substantial semicircle.

10. A section device for an internal combustion engine, comprising:

a throttle body having a throttle valve for adjusting a quantity of air sucked into a plurality of cylinders via an air cleaner;

a surge tank;

a throttle passage extending between said throttle body and said surge tank; and a plurality of suction manifolds connecting said surge tank with suction ports of said cylinders of the internal combustion engine, wherein the throttle passage extends in a direction parallel to a longitudinal direction of the surge tank and terminates at an air connector in flow communication with the surge tank through an opening defined in a wall of the surge tank in a position corresponding to a substantial center of the suction manifolds which open to the surge tank.

11. A surge tank as in claim 10, wherein said throttle passage and said surge tank include a common wall through which said opening is defined.

12. A suction device as in claim 10, wherein the suction manifolds are formed to extend from the surge tank to the suction ports in such a manner that the suction manifolds substantially encircle outer circumferential wall faces of the air connector and surge tank.

13. A suction device as in claim 10, wherein a wall thickness in the circumferential direction of a wall forming a suction passage of the suction manifold is substantially uniform, a first wall thickness in the circumferential direction of a first section of the wall of the suction manifold disposed substantially perpendicular to a running direction of the vehicle on the front face side of the internal combustion engine is smaller than a second wall thickness in a circumferential direction of a second section of the wall of the suction manifold disposed substantially horizontal to the running direction of the vehicle.

14. A suction device as in claim 13, wherein a profile of a cross section of the wall of the suction device in a transition region from a portion substantially perpendicular to a running direction of the vehicle on the front face side of the internal combustion engine to a portion substantially horizontal to the running direction of the vehicle is formed into at least a substantial semicircle.

* * * * *